June 3, 1958 D. S. JENNEY 2,837,301
CONVERTIPLANE WITH AUTOMATIC ROTOR-AILERON COUPLING
Filed Dec. 10, 1956 3 Sheets-Sheet 1
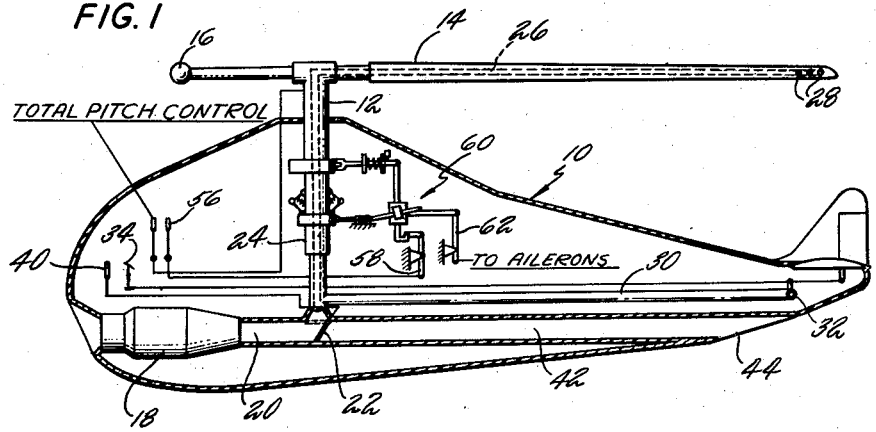
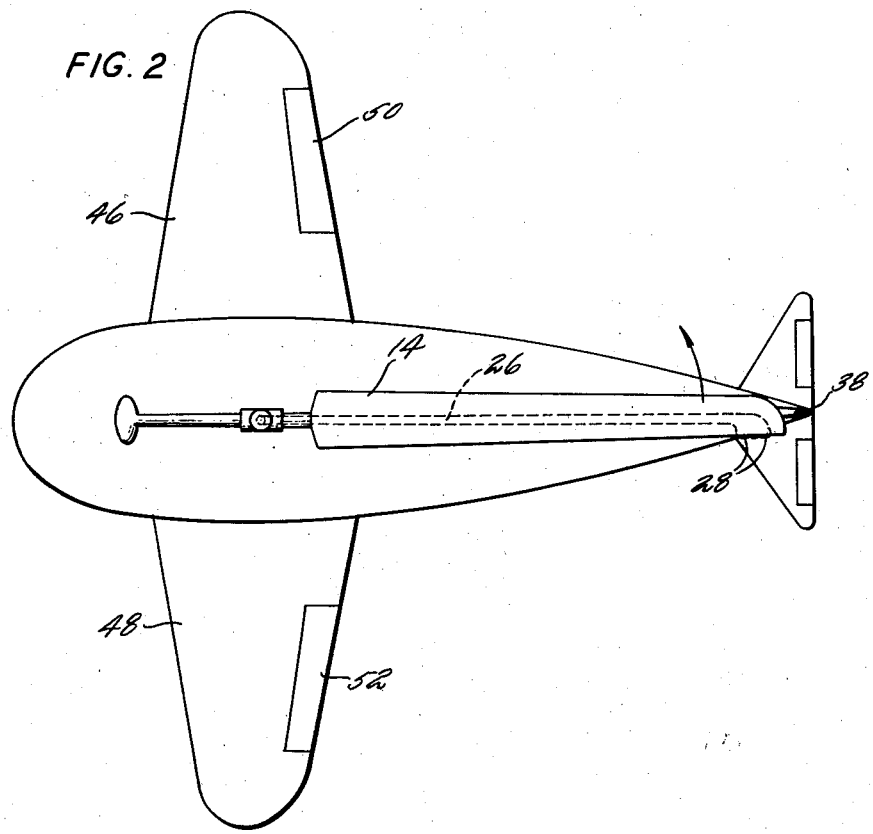
INVENTOR
DAVID S. JENNEY
BY
ATTORNEY June 3, 1958  D. S. JENNEY  2,837,301
CONVERTIPLANE WITH AUTOMATIC ROTOR-AILERON COUPLING
Filed Dec. 10, 1956  3 Sheets-Sheet 2

INVENTOR
DAVID S. JENNEY
BY
ATTORNEY

June 3, 1958 D. S. JENNEY 2,837,301
CONVERTIPLANE WITH AUTOMATIC ROTOR-AILERON COUPLING
Filed Dec. 10, 1956 3 Sheets-Sheet 3

INVENTOR
DAVID S. JENNEY
BY
ATTORNEY

United States Patent Office 2,837,301
Patented June 3, 1958

2,837,301

CONVERTIPLANE WITH AUTOMATIC ROTOR-AILERON COUPLING

David S. Jenney, Manchester, Conn., assignor to United Aircraft Corporation, East Hartford, Conn., a corporation of Delaware Application December 10, 1956, Serial No. 627,473

8 Claims. (Cl. 244—7)

This invention relates to convertiplanes and more particularly to convertiplanes having a fixed main wing and a single blade rotor.

In convertiplanes having a fixed wing and a single stowable rotor blade the rotor blade is used for take-off and landing but is stopped and stored out of the airstream or streamlined therewith in a trailing position for cruising flight. One of the primary objections of this configuration has been the presence of high rolling moments exerted on the ship by the single blade during its first few slow revolutions after starting. Normally the blade is restrained from flapping during this regime of flight. This same problem is particularly acute in case of engine failure during cruise. The blades cannot then be started at zero lift since the rotor must provide its own torque to accelerate autorotatively. To do this there must be some angle of attack on the blade and the resulting rolling moments occur.

It is therefore an object of this invention to provide an automatic rotor-aileron coupling whereby the ailerons are operated differentially at a frequency commensurate with the speed of rotation of the single rotor blade.

It is another object of this invention to provide a rotor-aileron coupling whereby the effect on the ailerons will vary with the variation in rotor speed, since as the speed increases, the rolling moments are not as severe.

It is a still further object of this invention to provide a manual aileron control which is coupled to the automatic aileron control.

It is a still further object of this invention to provide a means for disabling the automatic aileron coupling.

These and other objects will become readily apparent from the following detailed description of the drawings in which:

Fig. 1 is a side view of a typical convertiplane including the coupling of this invention;

Fig. 2 is a plan view of Fig. 1 and illustrates the fixed wing and ailerons including the rotor in the trailing position;

Figure 3:
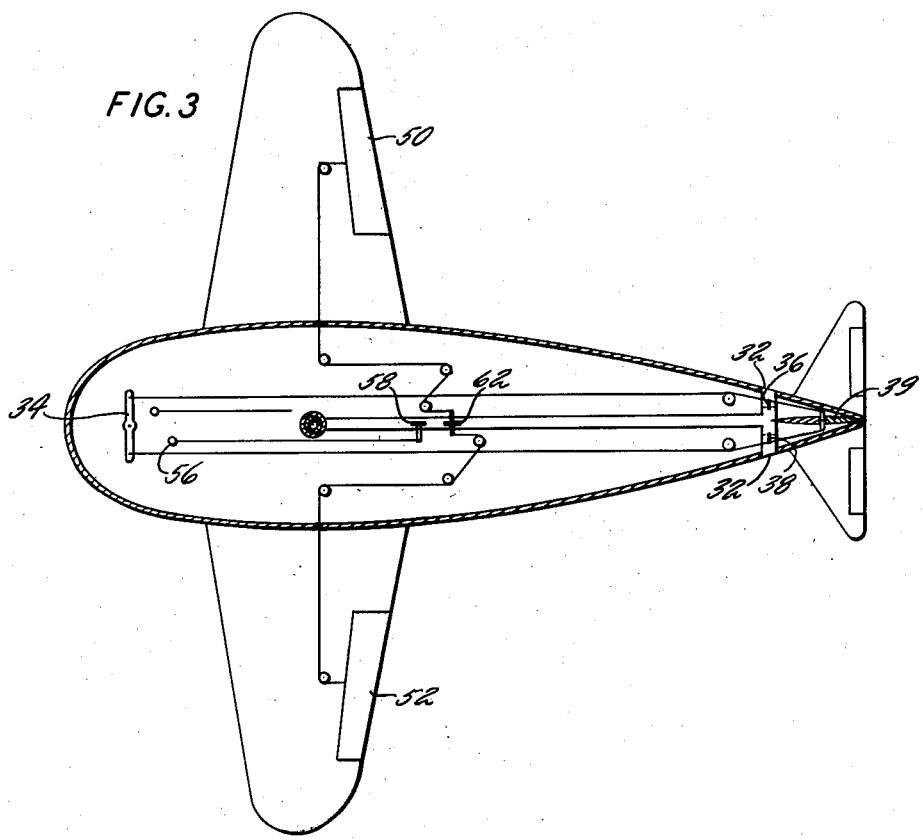
Fig. 3 is similar to Fig. 2 but shows schematically some of the manual controls for the convertiplane.

An ordinary convertiplane (as, for example, shown in Patent No. 2,690,886) normally has fixed wings with usual ailerons which might be used to overcome the moments exerted by a slow rotating single rotor. According to this invention an automatic coupling between the rotor and ailerons is proposed so that for standard rotor pitch settings to be used for all rotor accelerations, the ailerons will at all times hold the ship at a reasonable trim attitude. As the rotor speed goes up, the oscillating rolling moments of a slow moving single blade become less important since the fuselage will not respond to their high frequencies. The coupling of this invention then has an authority that decreases with increasing rotor speed, whereby the magnitude of the inertial forces involved can be limited.

Referring to Fig. 1, a convertiplane is schematically illustrated as having a fuselage generally indicated at 10 including a main rotor shaft 12 and a single blade rotor 14 which has a matching counterbalance 16. A gas generating power plant 18 such as a turbojet may be provided for exhausting gases into a duct 20. The gases in the duct 20 may drive a turbine-compressor arrangement to supply cold air to the rotor blades or hot air as shown. The duct 20 includes a valve 22 which in the position shown ducts flow upwardly through a passage 24 in the rotor shaft and then by suitable means to a passage 26 in the rotor 14, which in turn includes exhaust ports 28 for ejecting the gases and propelling the blade. The ducts in the rotor blade and exhaust ports 28 are more clearly shown in Fig. 2.

Again referring to Fig. 1 when gases are being conducted to the passage 24, they may also pass through an aft extending passage 30 which leads to lateral openings 32 for providing directional control for the helicopter. As seen in Fig. 3, a rudder bar type control 34 may selectively control valves 36 and 38 to vary the amount of flow passing to the openings 32. The rudder bar 34 may also control a rudder 39 for providing directional control when the aircraft is flying in a conventional manner.

Reverting now to Fig. 1, when the valve 22 is moved to its dotted or up position by its control 40, the flow of gases to the passages 24 and 30 is cut off and the gases from the duct 20 are ducted to the aft extending exhaust passage 42 to a propulsive nozzle 44. Under these conditions the blade 26 would be stowed or stopped in a trailing position and the lift would be provided by the main wings 46 and 48 shown in Fig. 2.

Under these conditions the ailerons 50 and 52 would provide lateral control, while the rudder 39 would provide directional control. As seen in Fig. 1, the aileron control 56 is connected to a link 58, which through the mixing linkage generally indicated at 60, eventually controls a link 62 leading to the ailerons 50 and 52. These particular elements are also shown in plan view in Fig. 3.

Figure 4:
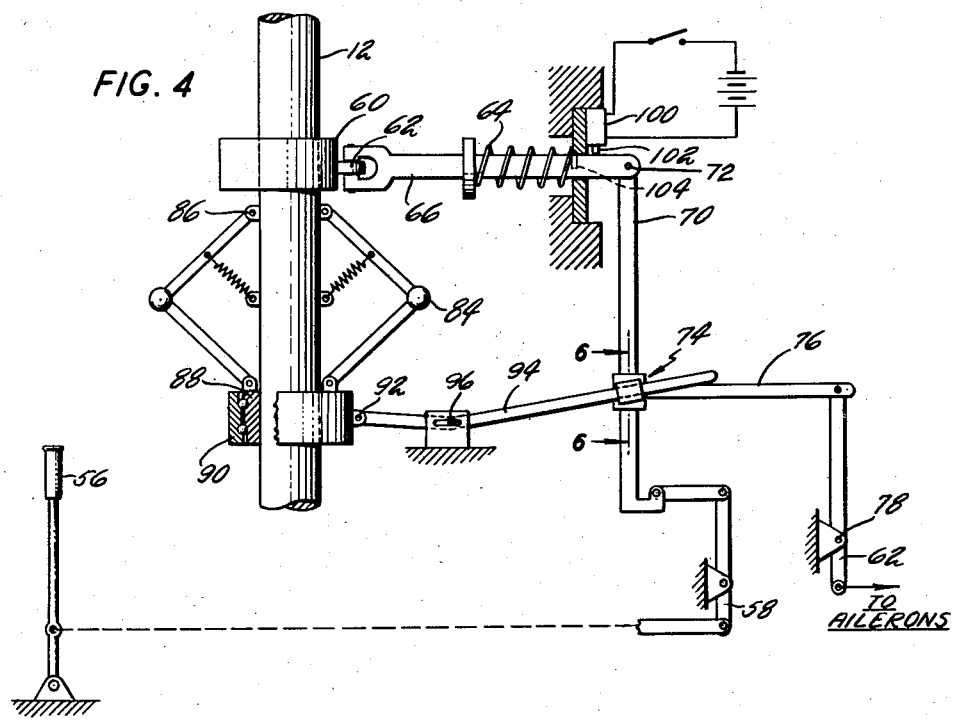
Figs. 4 and 5 are enlarged detailed schematics illustrating the automatic rotor-aileron coupling mechanism in both positions of operation.
Figure 5:
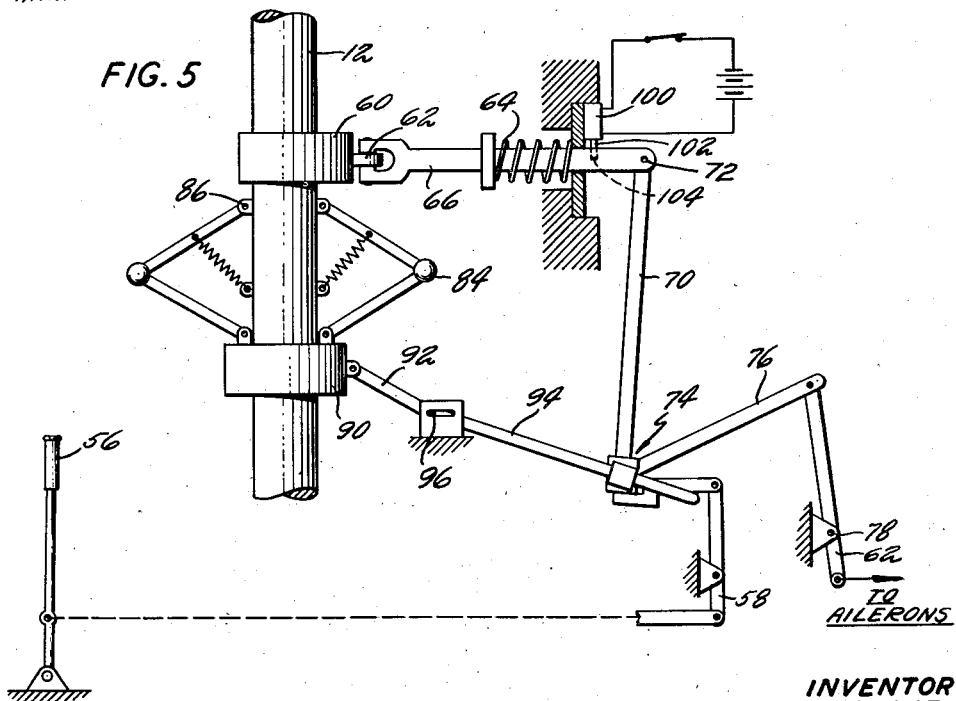

The mixing linkage 60 which is generally indicated in Fig. 1 is shown in enlarged fashion in Figs. 4 and 5. As seen herein in Fig. 4 the rotor shaft 12 has a cam 60 and a cam follower 62 which is loaded for movement toward the left by a spring 64. This cam follower 62 tends to reciprocate a shaft 66 due to the eccentricity of the cam 60. The shaft 66 in turn rocks an arm 70 back and forth. When the control shaft 56 and link 58 are fixed, the arm 70 will pivot about the point 72 thus, through the sliding block or linkage 74, will move arm 76 and pivot member 62 intermediate its ends about the pivot 78. Thus, for the slow operating R. P. M.'s of the rotor shaft 12 the parts just described would cause the ailerons to be differentially operated in a synchronized fashion with the rotation of the shaft 12. However, as the speed of rotation of the shaft 12 increases, it is desired to decrease the effect of the automatic differential operation of the ailerons. To this end as seen in both Figs. 4 and 5, a flyweight 84 is fixed to the shaft 86 and at its bottom to the inner race of a slidable bearing type coupling 88. The member 88 rotates with the shaft 12, while the outer member 90 does not rotate and is fixed at 92 to one end of a pivotable member 94 which pivots about the point 96. The right-hand end of the member 96 is suitably connected to the sliding block 74. As seen in Fig. 4, any reciprocation of the rod 66 will tend to rock the arm 70 about point 72 so that a considerable effect will be had on the arm 76 and the link 62. As seen in Fig. 5, as the speed of rotation of the shaft 12 is increased, the flyweights 84 move outwardly thereby raising the collar 90 and causing the link 92 to pivot about the point 96, thereby lowering the sliding block 74. In this position of the sliding block 74 any reciprocating or rocking movement of the arm 70 will have little or no effect on the link 76 and the link 62 leading to the ailerons. Thus, the effect of the automatic means for differentially operating the ailerons is substantially nullified. In order to prevent the automatic mechanism from attempting to continue oscillation, a solenoid 100 may be provided with a plunger 102 which may engage a slot 104 in the rod 66 to hold it in a fixed substantially disengaged position from the eccentric cam 60.

In the position shown in Fig. 5, the aileron control 56 can still exert substantially the same effect on the ailerons through the corresponding linkage, while the automatic means has little or no effect.

Figure 6:
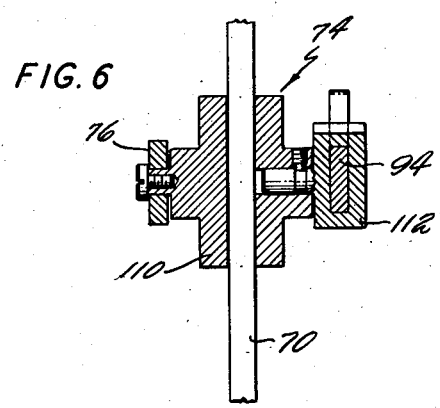
Fig. 6 is a detailed showing of the sliding block portion of the coupling as taken along the line 6—6 of Fig. 5.

The sliding block 74 (Fig. 6) comprises several elements. The sliding block 74 comprises a main block 110 in which the member 70 can slide up and down. Another block 112 is pivotally connected to the block 110 and has the arm 94 slidably therein. The arm 76 of Figs. 4 and 5, on the other hand, is pivoted on the left side of the main block 110.

As a result of this invention it is apparent that a highly effective yet simple means for controlling rolling moments of a single blade convertiplane has been provided. Furthermore, a mechanism for providing automatic operation of the ailerons with a means for reducing the effect of the automatic operation has also been provided.

Although only one embodiment of this invention has been illustrated and described herein, it will be apparent that various changes and modifications may be made in the construction and arrangement of the various parts without departing from the scope of this novel concept.

What it is desired by Letters Patent is:

1. In a convertiplane having fixed laterally extending wings and a single variable pitch rotor blade, an aileron carried by each of said wings, means for varying the position of said ailerons in timed relation with the rotation of said rotor blade, and means responsive to the speed of rotation of said rotor blade for varying the effect of said aileron position varying means on said ailerons.

2. In a convertiplane having fixed laterally extending wings and a single variable pitch rotor blade, an aileron carried by each of said wings, a manual control for varying the position of said ailerons, second means for automatically varying the position of said ailerons in timed relation with the rotation of said rotor blade, means interconnecting said manual control and said automatic means, and means responsive to the speed of rotation of said rotor blade for varying the effect of said manual and automatic aileron position varying means on said ailerons.

3. In a convertiplane having fixed laterally extending wings and a single variable pitch rotor blade, an aileron carried by each of said wings, a manual control for varying the position of said ailerons, means for automatically varying the position of said ailerons in timed relation with the rotation of said rotor blade, means interconnecting said manual control and said automatic aileron varying means, and means responsive to an increase in speed of rotation of said rotor blade for decreasing the effect of said automatic aileron position varying means on said ailerons.

4. In a convertiplane having fixed laterally extending wings and a single variable pitch rotor blade, an aileron carried by each of said wings, a manual control for varying the position of said ailerons, means for automatically varying the position of said ailerons in timed relation with the rotation of said rotor blade, means interconnecting said manual control and said automatic aileron varying means, and mixing means responsive to a change in speed of rotation of said rotor blade for changing the effect of said automatic aileron position varying means on said ailerons, including a governor and an intermixing linkage connected to said manual control.

5. In a convertiplane having fixed laterally extending wings and a single variable pitch rotor blade, an aileron carried by each of said wings, manual means for varying the position of said ailerons, means responsive to the rotation of said blade for automatically and cyclically varying the position of said ailerons with each revolution of said blade, means connecting said manual and automatic means, and speed responsive means for increasing the cyclic variation of said ailerons by said automatic means with decrease in R. P. M. of said rotor blade.

6. In a convertiplane having fixed laterally extending wings and a single variable pitch rotor blade, an aileron carried by each of said wings, manual means for varying the position of said ailerons, means responsive to the rotation of said blade for automatically and cyclically varying the position of said ailerons with each revolution of said blade, means connecting said manual and automatic means, and speed responsive means including a governor for increasing the degree of cyclic variation of said ailerons by said automatic means with decrease in R. P. M. of said rotor blade.

7. In a convertiplane according to claim 6 including means for disabling said automatic means.

8. In a convertiplane having fixed laterally extending wings and a single variable pitch rotor blade, an aileron carried by each of said wings, manual means for varying the position of said ailerons, means responsive to the rotation of said blade for automatically and cyclically varying the position of said ailerons with each revolution of said blade, means connecting said manual and automatic means, and speed responsive means including a governor for increasing the cyclic variation of said ailerons by said automatic means with decrease in R. P. M. of said rotor blade and vice versa, said last mentioned speed responsive means including a variable pivot connected to said governor.

References Cited in the file of this patent

UNITED STATES PATENTS

| | | |
|---|---|---|
| 2,437,330 | Mullgardt | Mar. 9, 1948 |
| 2,702,168 | Platt | Feb. 15, 1955 |
| 2,731,215 | Avery | Jan. 17, 1956 |